United States Patent
Scheinert

(10) Patent No.: US 7,021,058 B2
(45) Date of Patent: Apr. 4, 2006

(54) SUPERCHARGING AIR COMPRESSOR FOR AN INTERNAL COMBUSTION ENGINE, INTERNAL COMBUSTION ENGINE AND METHOD FOR THAT PURPOSE

(75) Inventor: Helmut Scheinert, Ebersbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/844,318

(22) Filed: May 13, 2004

(65) Prior Publication Data

US 2005/0022526 A1 Feb. 3, 2005

(30) Foreign Application Priority Data

May 14, 2003 (DE) ................ 103 21 572

(51) Int. Cl.
*F02B 33/44* (2006.01)
*F04B 17/00* (2006.01)
*F01D 1/12* (2006.01)
*F01D 1/02* (2006.01)

(52) U.S. Cl. ............... 60/611; 60/605.1; 417/406; 415/58.4; 415/206

(58) Field of Classification Search .......... 60/611, 60/605.1; 123/564; 417/406; 415/116, 415/206, 58.4, 914
See application file for complete search history.

(56) References Cited

U.S. PATENT DOCUMENTS

| 6,190,123 | B1 * | 2/2001 | Wunderwald et al. | 415/116 |
| 6,257,834 | B1 * | 7/2001 | Bremer et al. | 417/406 |
| 6,416,281 | B1 * | 7/2002 | Bremer et al. | 415/116 |
| 6,668,553 | B1 * | 12/2003 | Ghizawi | 415/116 |
| 6,701,710 | B1 * | 3/2004 | Ahrens et al. | 60/611 |
| 6,813,887 | B1 * | 11/2004 | Sumser et al. | 60/611 |

FOREIGN PATENT DOCUMENTS

DE 198 08 633 A1 2/1998

* cited by examiner

*Primary Examiner*—Thai-Ba Trieu
(74) *Attorney, Agent, or Firm*—Crowell & Moring LLP

(57) ABSTRACT

A supercharging air compressor for an internal combustion engine, having a compressor wheel which is rotatably mounted in a compressor inlet duct, and to which combustion air can be fed via the compressor inlet duct. A partial stream of the compressed supercharging air is branched off downstream of the compressor wheel and is fed to a temperature reducing unit. The branched-off partial stream is fed, as cooling air, to a component of the supercharging air compressor after it has flowed through the temperature reducing unit.

12 Claims, 2 Drawing Sheets

SUPERCHARGING AIR COMPRESSOR FOR AN INTERNAL COMBUSTION ENGINE, INTERNAL COMBUSTION ENGINE AND METHOD FOR THAT PURPOSE

This application claims the priority of 103 21 572.7, filed Mar. 14, 2003, the disclosure of which is expressly incorporated by reference herein.

BACKGROUND OF THE INVENTION

The invention relates to a supercharging air compressor for an internal combustion engine, to an internal combustion engine and to a method for that purpose.

The document DE 198 08 633 A1 discloses compressing sucked-in combustion air for an internal combustion engine to supercharging pressure in a supercharging air compressor, the temperature of which air is reduced in a supercharging air cooler which is connected downstream. So that the supercharging air temperature is additionally reduced, a cooling air compressor is provided in parallel with the supercharging air compressor in the intake system, a cooling air cooler and a diffuser, in which the cooling air is relaxed to ambient pressure, being connected downstream of said supercharging air compressor. The cooling air is then fed to an additional cooler in the intake tract in which the supercharging air which emerges from the supercharging air cooler is additionally cooled once more. This additionally cooled supercharging air is then fed to the cylinders of the internal combustion engine.

It is possible to reduce the temperature of the supercharging air using this structurally complex system. However, it remains problematical that, in particular when high supercharging pressures are required, the temperatures increase greatly directly at the compressor outlet of the supercharging air compressor, which leads to high thermal loading of the components of the supercharging air compressor. In order to ensure that the compressor functions according to the specifications, it is necessary either to use high quality materials which withstand these thermal loads, which is however associated with considerable material costs, or to cool the compressor housing, which is associated with high additional structural complexity and a result of which the thermal loads of the compressor wheel are not reduced, or not reduced significantly.

The invention is based on the problem of reducing the thermal loading in a supercharging air cooler using simple measures.

This problem is solved according to the invention with a supercharging air compressor having the following features.

In the supercharging air compressor according to the invention, a partial stream of the compressed supercharging air is branched off downstream of the compressor wheel, is led through a temperature reducing unit which is assigned to the supercharging air compressor, and is subsequently fed to a component of the supercharging air compressor, in particular to the compressor wheel, as cooling air. In this way, the temperature level of the components of the supercharging air compressor is reduced, specifically in particular the temperature of the compressor wheel and also the temperature of the compressor housing. It is also possible to use, for example, cost-effective aluminium as the material for the compressor housing and the compressor wheel, even at high supercharging pressures. The fed-back cooling air stream ensures sufficient cooling of the supercharging air compressor.

It may be expedient to adopt an embodiment in which the magnitude of the fed-back partial air stream which is used for cooling can be adjusted as a function of the state variables and operating variables of the internal combustion engine. The fed-back partial stream can in particular also be completely shut off if this is permitted by the temperature conditions in the supercharging air compressor. On the other hand, the fed-back cooling air stream is limited only by the magnitude of the mass stream passing through the supercharging air compressor.

The feeding back of the partial air stream with temperature reduction constitutes a cost-effective measure for cooling the supercharging air compressor which is easy to implement. The temperature reducing unit may be embodied in particular as a passive component, in particular as a diffuser, which consumes no additional energy. In such a diffuser, the temperature reduction is brought about by relaxing the fed-back air mass stream. The relaxing is advantageously carried out to ambient pressure, at which the fed-back cooling air is preferably introduced into the compressor inlet duct, in which the fed-back mass stream is combined with the combustion air which is sucked in from the surroundings.

The temperature reducing unit is advantageously connected to the compressor housing and forms, for example, a single-piece component with it. This embodiment is defined by a particularly compact design.

After the partial stream has flowed through the temperature reducing unit, the cooled air is introduced in particular into the compressor inlet duct, as a result of which the compressor wheel and the walls which surround the compressor wheel are cooled. The cooled air can be introduced in particular via an additional duct which opens into the compressor inlet duct adjacent to the compressor wheel, preferably directly upstream of the axial end side of the compressor wheel blade and/or radially at the level of the compressor wheel blade. This additional duct may be part of what is referred to as a characteristic-diagram-stabilizing measure which can be used to extend the operating range of the compressor. As a result, the additional duct can axially bridge the compressor wheel inlet edge and form a bypass to the compressor inlet duct, as a result of which the pumping limit of the compressor can be displaced in favour of smaller mass streams. When the compressor is operating near to the pumping limit, the bypass permits a partial mass stream to be recirculated counter to the main flow direction in the compressor inlet duct. The fed-back partial mass stream is fed back to the main mass stream and conveyed back into the compressor via the bypass. The pumping limit is displaced here in favour of a larger operating range. Such a bypass or additional duct can then also be used for introducing the cooling air stream, the additionally introduced mass stream also influencing the pumping limit positively.

In the internal combustion engine according to the invention having a supercharging air compressor in the intake tract, a temperature reducing unit is provided downstream of the compressor wheel, it being possible to feed a partial stream of the compressed supercharging air to said temperature reducing unit. The partial stream is fed, as cooling air, to the supercharging air compressor after it has flowed through the temperature reducing unit. The partial stream is branched off here in particular downstream of a supercharging air cooler in the intake tract and fed back to the supercharging air compressor. In this way, two-stage cooling can be implemented for the fed-back partial air stream; firstly in the supercharging air cooler and then in the temperature reducing unit.

In the method according to the invention for cooling the supercharging air compressor, a partial stream of the supercharging air which is compressed in the supercharging air compressor is branched off downstream of the compressor wheel, the temperature of this partial stream is reduced and finally the partial stream is fed back, as cooling air, to the supercharging air compressor. The magnitude of the fedback partial air stream can expediently be adjusted here; it is in particular possible to shut off the partial mass stream completely.

Other objects, advantages and novel features of the present invention will become apparent from the following detailed description of the invention when considered in conjunction with the accompanying drawings.

DETAILED DESCRIPTION OF THE DRAWINGS

In the figures, identical components are provided with identical reference symbols.

Figure 1:
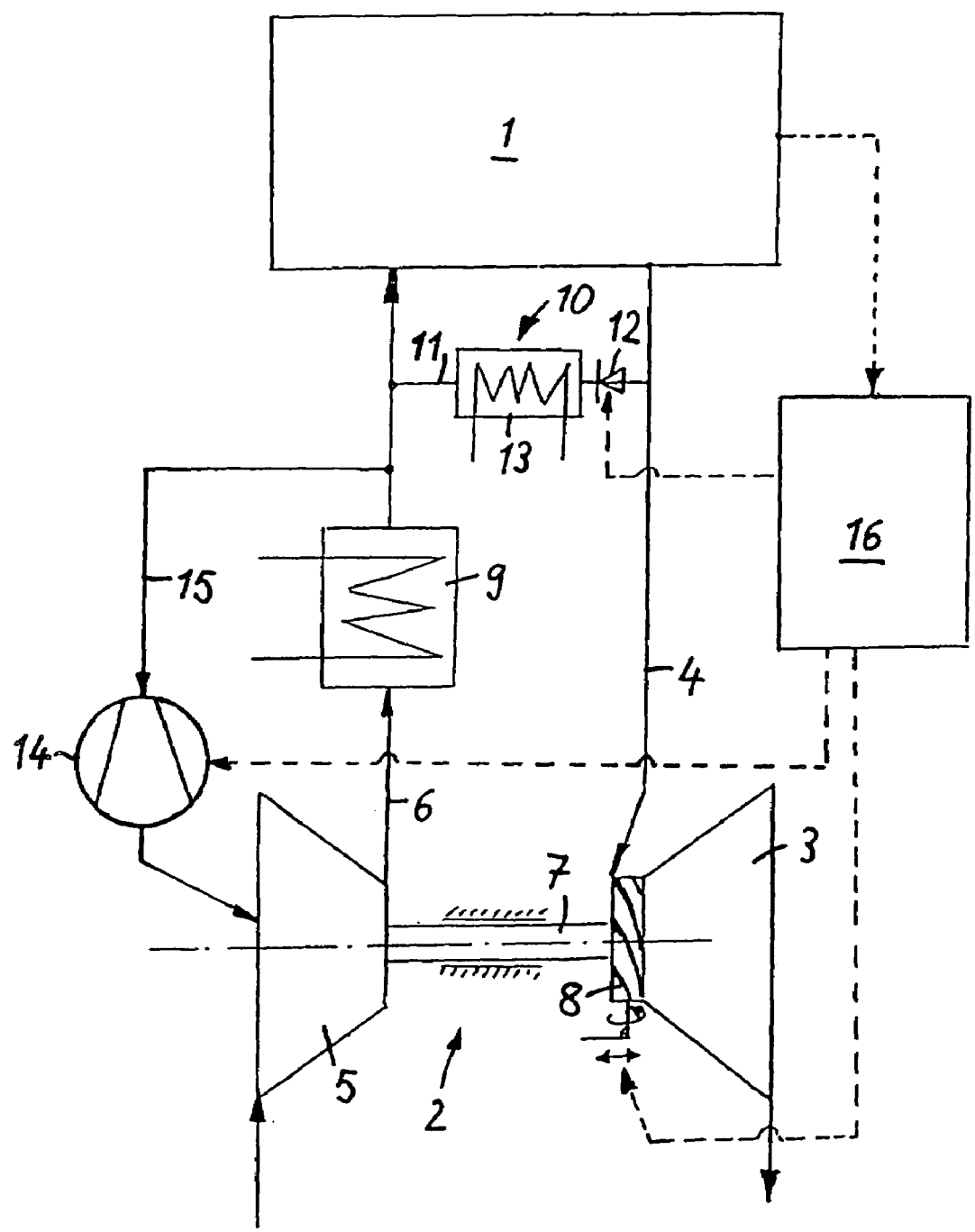
FIG. 1 is a schematic view of a supercharged internal combustion engine having a supercharging air compressor in the intake tract to which a temperature reducing unit is assigned, via which temperature reducing unit a partial mass stream which is branched off downstream of a supercharging air cooler is cooled and then can be fed back to the supercharging air compressor.

The internal combustion engine 1—an Otto engine or a diesel internal combustion engine—which is illustrated in FIG. 1 is assigned an exhaust gas turbocharger 2 which comprises an exhaust gas turbine 3 in the exhaust gas tract 4 and a supercharging air compressor 5 in the intake tract 6, the compressor wheel of the supercharging air compressor being driven by the turbine wheel by means of a shaft 7. The exhaust gas turbine 3 can be equipped with a variable turbine geometry for variably setting the effective turbine inlet cross section as a function of the state variables and operating variables of the internal combustion engine or of the assemblies assigned to the internal combustion engine. The variable turbine geometry is, for example, an adjustable guide cascade or a guide cascade with adjustable guide blades in the turbine inlet cross section.

The combustion air which is sucked in by the supercharging air compressor 5 is compressed to an increased pressure and fed, downstream of the compressor 5, to a supercharging air cooler 9 in the intake tract 6, in which the compressed air is cooled to a low temperature. The compressed air is then fed as supercharging air under supercharging pressure to the cylinders of the internal combustion engine.

On the exhaust gas side, the exhaust gas which is produced by the internal combustion engine 1 is directed into the exhaust gas tract 4 and fed to the exhaust gas turbine 3 under exhaust gas backpressure in which the exhaust gas is relaxed. Downstream of the exhaust gas turbine, the relaxed exhaust gas is usually subjected to catalytic and/or filter cleaning and then output. The energy which is released when the exhaust gas is relaxed is transmitted by the turbine wheel to the compressor wheel via the shaft 7.

The internal combustion engine is also assigned an exhaust gas feedback device 10 which comprises a return line 11 which branches off from the exhaust gas tract 4 upstream of the exhaust gas turbine 3, and opens into the intake tract 6 downstream of the supercharging air cooler 9. An adjustable shut-off valve 12 and an exhaust gas cooler 13 downstream of the shut-off valve are arranged in the return line 11.

In a line 15 which branches off from the intake tract 6 downstream of the supercharging air cooler 9 and leads back to the compressor 5 there is a temperature reducing unit 14 which is embodied as a diffuser and via which a partial air stream which is fed back via the line 15 is additionally cooled and then fed back to the supercharging air compress 5 for cooling.

Finally, the internal combustion engine 1 is assigned an adjusting and control unit 16 in which actuating signals for fitting the various assemblies of the internal combustion engine, in particular for setting the variable turbine geometry 8, the shut-off valve 12 of the exhaust gas feedback device 10 and an adjustable shut-off valve which is assigned to the temperature reducing unit 14 and has the purpose of setting the partial air stream which is to be fed back, can be generated as a function of state variables and operating variables of the internal combustion engine.

Figure 2:
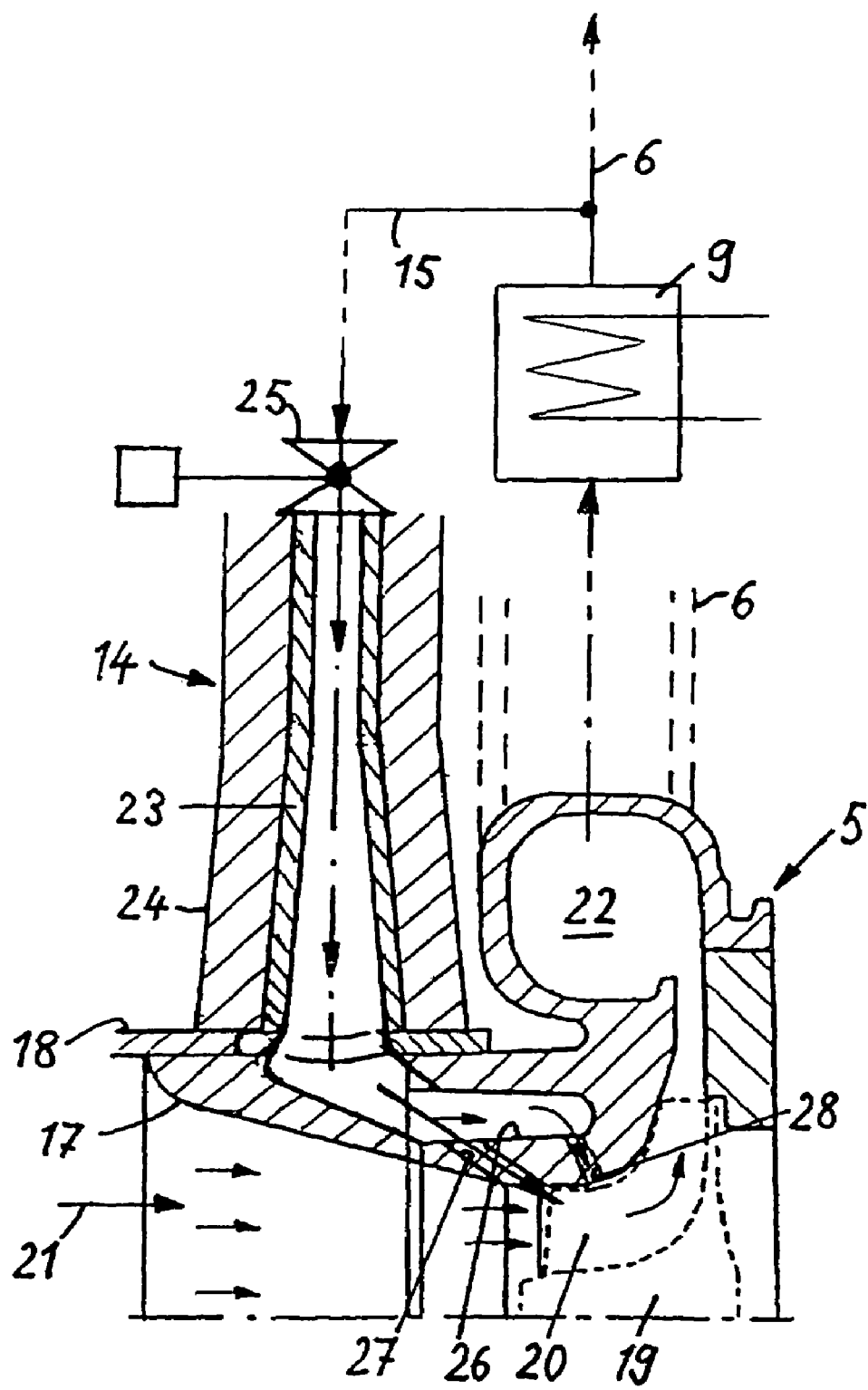
FIG. 2 shows a section through a supercharging air compressor having an integrated temperature reducing unit which is embodied as a diffuser.

As is apparent from FIG. 2, the supercharging air compressor 5 comprises a compressor wheel 19 which is rotatably mounted in a compressor inlet duct 17 which is formed in the compressor housing 18, said compressor wheel 19 being driven by the exhaust gas turbine via the shaft. Combustion air is introduced into the compressor inlet duct 17 from the surroundings in the direction of the arrow 21 and is fed axially onto the compressor wheel 19 whose compressor wheel blades 20 compress the combustion air and divert it radially into an annular duct 22 in the compressor housing from which the compressed combustion air is passed on into the intake tract 6. The supercharging air cooler 9 is mounted in the intake tract 6 downstream of the compressor 5. After the supercharging air passes through the supercharging air cooler 9, the supercharging air and the supercharging pressure are fed back to the cylinders of the internal combustion engine.

The line 15 via which a partial air stream of the compressed supercharging air is fed back to the compressor 5 branches off downstream of the supercharging air cooler 9. The line 15 opens into the temperature reducing unit 14 which is embodied as a diffuser 23 and in which the fed-back partial air stream is relaxed to ambient pressure, after which said partial air stream experiences a significant drop in temperature. The wall of the diffuser 23 is permanently coupled to the compressor housing 18. The diffuser 23 is expediently surrounded by an insulating layer 24.

An adjustable shut-off valve 25 by means of which the magnitude of the partial air stream to be fed back can be adjusted is arranged in the region of the flow inlet of the diffuser 23.

The flow outlet of the diffuser 23 communicates with an annular additional duct 26 which encloses the compressor inlet duct 17 in an annular shape. The additional duct 26 is part of a characteristic-diagram-stabilizing measure with which the operating range of the compressor can be increased, in particular the pumping limit of the compressor can be displaced in favour of smaller mass streams. The diffuser 23 is seated radially on the compressor housing 18, the flow outlet of the diffuser communicating with an opening of the additional duct 26 in the outer surface of the compressor housing.

The additional duct 26 which radially encloses the compressor inlet duct 17 is connected to the compressor inlet duct 17 via two duct sections 27 and 28. The first duct section 27 opens axially into the compressor inlet duct 17 directly upstream of the compressor wheel inlet edge. This duct section 27 extends with a radial component and axial component and opens into the compressor inlet duct at an angle with respect to the longitudinal axis of the compressor wheel.

The second duct section 28 extends in a virtually radial direction with respect to the longitudinal axis of the compressor wheel and opens into the compressor inlet duct 17 downstream of the first duct section 27 and downstream of the compressor wheel inlet edge at the level of the compressor wheel blades 20 of the compressor wheel 19. Cold air which opens into the additional duct 26 of the diffuser 23 thus passes into the compressor inlet duct both via the first duct section 27 and via the second duct section 28.

The additional duct 26 extends in the compressor housing 18 so that cold air flowing radially into the additional duct via the diffuser 23 causes the compressor housing to be cooled. The cooling air which then impinges on the compressor wheel 19 also cools the compressor wheel.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for cooling a supercharging air compressor for an internal combustion engine, in which a partial stream of supercharging air which is compressed in the supercharging air compressor is branched off downstream of a compressor wheel, a temperature of the partial stream is reduced and the partial stream is then fed back, as cooling air, to a compressor inlet duct upstream of the supercharging air compressor duct, wherein the temperature reducing unit is a diffuser for diffusing the partial stream.

2. The method as claimed in claim 1, wherein the magnitude of the partial air stream is adjustable.

3. A method for cooling a supercharging air compressor for an internal combustion engine, comprising the steps of:
   extracting a partial stream of compressed supercharging air discharged from the compressor into a passage connecting a compressor outlet with a compressor inlet;
   reducing the temperature of the compressed supercharging air in a temperature reducing unit in the connecting passage between the compressor outlet and the compressor inlet, wherein the temperature reducing unit is a diffuser for diffusing the partial stream; and
   discharging the reduced-temperature partial stream to the compressor inlet upstream of a compressor wheel of the compressor.

4. An internal combustion engine having a supercharging air compressor in an intake tract, and a temperature reducing unit which is arranged downstream of a compressor wheel, an inlet duct being arranged to receive a partial stream of supercharging air which has been compressed by the compressor wheel, wherein the partial stream is fed, as cooling air, to the inlet duct upstream of the supercharging air compressor after the partial stream has flowed through the temperature reducing unit, wherein the temperature reducing unit is a diffuser for diffusing the partial stream.

5. The internal combustion engine as claimed in claim 4, wherein a supercharging air cooler is arranged downsteam of the supercharging air compressor in the intake tract, and wherein the partial stream of the compressed supercharging air branches off downstream of the supercharging air cooler and is fed to the temperature reducing unit.

6. The internal combustion engine as claimed in claim 4, wherein the supercharging air compressor is part of an exhaust gas turbocharger with an exhaust gas turbine which is arranged in an exhaust gas tract and which drives the compressor wheel via a shaft.

7. A supercharging air compressor for an internal combustion engine, having a compressor wheel which is rotatably mounted in a compressor inlet duct and arranged to receive combustion air via the compressor inlet duct, said compressor inlet duct being arranged to receive a partial stream of supercharging air which has been compressed by the compressor wheel, the partial stream having branched off downstream of the compressor wheel and fed to a temperature reducing unit prior to being fed to the compressor inlet duct, wherein the temperature reducing unit is a diffuser for diffusing the branched-off partial stream.

8. The supercharging air compressor as claimed in claim 7, wherein the temperature reducing unit is connected to a compressor housing.

9. The supercharging air compressor as claimed in claim 7, wherein the flow outlet of the temperature reducing unit is connected to a supplementary duct which opens into the compressor inlet duct adjacent to the compressor wheel.

10. The supercharging air compressor as claimed in claim 9, wherein the supplementary duct is part of a characteristic-diagram-stabilizing measure in the compressor housing.

11. A supercharging air compressor for an internal combustion engine, comprising:
   a compressor housing;
   a compressor wheel rotatably mounted in a compressor inlet duct of the housing which receives combustion air from the compressor inlet duct and discharges compressed supercharging air to a compressor outlet; and
   a passage connecting the compressor outlet to the compressor inlet duct via a temperature reducing unit therebetween for passing a partial stream of the compressed supercharging air through the temperature reducing unit to the compressor inlet duct,
   wherein the temperature reducing unit is a diffuser for diffusing the partial stream.

12. A supercharged internal combustion engine, comprising:
   an internal combustion engine;
   a supercharger compressor housing disposed in an intake air passage of the engine;
   a compressor wheel rotatably mounted in a compressor inlet duct of the housing which receives combustion air from the inlet duct and discharges compressed supercharging air through a compressor outlet; and
   a passage connecting the compressor outlet to the compressor inlet duct via a temperature reducing unit therebetween for passing a partial stream of the compressed supercharging air through the temperature reducing unit to the compressor inlet duct,
   wherein the temperature reducing unit is a diffuser for diffusing the partial stream.

* * * * *